United States Patent
Lee et al.

(10) Patent No.: US 10,105,904 B2
(45) Date of Patent: Oct. 23, 2018

(54) DEVICE AND METHOD FOR SUPPORTING 3D OBJECT PRINTING AND APPARATUS FOR PROVIDING 3D OBJECT PRINTING SERVICE

(71) Applicant: Electronics and Telecommunications Research Institute, Daejeon (KR)

(72) Inventors: Seung-Wook Lee, Daejeon (KR); In-Su Jang, Daejeon (KR); Jin-Sung Choi, Daejeon (KR); Bon-Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 697 days.

(21) Appl. No.: 14/325,816

(22) Filed: Jul. 8, 2014

(65) Prior Publication Data

US 2015/0032241 A1    Jan. 29, 2015

(30) Foreign Application Priority Data

Jul. 24, 2013 (KR) ............... 10-2013-0087142
Feb. 11, 2014 (KR) ............... 10-2014-0015362

(51) Int. Cl.
*B33Y 50/02* (2015.01)
*B29C 67/00* (2017.01)

(52) U.S. Cl.
CPC .......... *B29C 67/0088* (2013.01); *B33Y 50/02* (2014.12)

(58) Field of Classification Search
CPC ..................... B29C 67/0088; B33Y 50/02
See application file for complete search history.

(56) References Cited

U.S. PATENT DOCUMENTS

2007/0134574 A1    6/2007 Lee et al.
2013/0015596 A1*   1/2013 Mozeika ............... B25J 9/0084
                                                 264/40.1
(Continued)

FOREIGN PATENT DOCUMENTS

KR    1020130038101 A    4/2013

OTHER PUBLICATIONS

Design and Fabrication of Materials with Desired Deformation Behavior. Article. [online]. Bickel. 2010 [retrieved on Jan. 26, 2017]. Retrieved from internet: <URL: http://vcg.seas.harvard.edu/files/pfister/files/mat_fab_sig10.pdf>.*

(Continued)

*Primary Examiner* — Robert E Fennema
*Assistant Examiner* — Marzia T Monty
(74) *Attorney, Agent, or Firm* — William Park & Associates Ltd.

(57) ABSTRACT

Disclosed herein is a device and method for supporting 3D object printing and an apparatus for providing a 3D object printing service. A proposed device for supporting 3D object printing includes an information collection unit for collecting preference information of a user and performance information of a 3D printer. A download unit downloads a 3D model that is an object to be printed and model information defined in the 3D model in response to a printable selection signal. A model information creation unit creates new model information based on the 3D model and the model information defined in the 3D model. A print control command generation unit generates a print control command based on the preference information of the user and the performance information of the 3D printer, output from the information collection unit, and the new model information, output from the model information creation unit.

12 Claims, 14 Drawing Sheets

(56) References Cited

U.S. PATENT DOCUMENTS

| | | | | |
|---|---|---|---|---|
| 2013/0103755 A1* | 4/2013 | Park | .................. | H04L 67/42 |
| | | | | 709/203 |
| 2013/0273509 A1* | 10/2013 | Mutti | ................. | G09B 19/0092 |
| | | | | 434/127 |
| 2013/0297320 A1* | 11/2013 | Buser | ................. | B29C 67/0055 |
| | | | | 704/275 |
| 2013/0301082 A1* | 11/2013 | Abeloe | ............... | B29C 67/0088 |
| | | | | 358/2.1 |
| 2013/0329258 A1* | 12/2013 | Pettis | .................. | F16M 13/022 |
| | | | | 358/1.15 |

OTHER PUBLICATIONS

Objet Launches New Bio-Compatible 3D Printing Material for Medical and Dental Solutions. Article. [online]. Objet Geometries Ltd. 2010 [retrieved on Feb. 1, 2017]. Retrieved from internet: <URL: http://www.prnewswire.com/news-releases/objet-launches-new-bio-compatible-3d-printing-material-for-medical-and-dental-solutions-130289703.html>.*

* cited by examiner

| 3DPrintingPreType{ | (Number of bits) | (Mnemonic) |
|---|---|---|
| numOfUnfavorateMaterialFlag | 1 | WHETHER TO USE UNFAVORITE MATERIAL ELEMENT |
| maxHeightFlag | 1 | WHETHER TO USE MAXIMUM HEIGHT ELEMENT |
| fillInnerHoleFlag | 1 | WHETHER TO USE ELEMENT FOR FILLING INNER SPACE OF PRINTING MATERIAL |
| SecurityLevelFlag | 1 | WHETHER TO USE SECURITY ELEMENT |
| UsePrinterSupporterFlag | 1 | WHETHER TO USE PRINT SUPPORTER ELEMENT |
| UseLayoutOptimizerFlag | 1 | WHETHER TO USE LAYOUT OPTIMIZER ELEMENT |
| UsePhysicalSimulationFlag | 1 | WHETHER TO USE PHYSICAL SIMULATION ELEMENT |
| If(numOfUnfavorateMaterialFlag){ | | |
| numOfUnfavorateMaterial | | NUMBER OF UNFAVORITE MATERIALS |
| for(k=0;k<numOfUnfavorate Material;k++){ | | |
| UnfavorateMaterial[k]; | | UNFAVORITE MATERIAL |
| } | | |
| } | | |
| If(maxHeightFlag){ | | |
| maxHeight; | 32 | MAXIMUM HEIGHT OF PRINTED OBJECT, IN mm |
| } | | |
| If(fillInnerHoleFlag){ | | |
| fillInnerHole; | 1 | FLAG FOR DETERMINING WHETHER TO FILL INNER SPACE OF PRINTED OBJECT |
| If(!fillInnerHole){ | | |
| thickness | 32 | THICKNESS OF HOLLOW PRINTED OBJECT, IN mm |
| } | | |
| } | | |

FIG. 6A

| | | |
|---|---|---|
| If(SecurityLevelFlag){ | | |
|    SecurityLevel; | 4 | SECURITY LEVEL |
| } | | |
| If(UsePrinterSupporterFlag){ | | |
|    UsePrinterSupporter; | 1 | WHETHER TO USE PRINT SUPPORTER |
| } | | |
| If(UseLayoutOptimizerFlag){ | 1 | WHETHER TO OPTIMIZE LAYOUT TO SAVE PRINT MATERIAL |
|    UseLayoutOptimizer; | | |
| } | | |
| If(UsePhysicalSimulationFlag){ | 1 | PERFORM SIMULATION OF SECURITY OR THE LIKE OF PRINTED STRUCTURE |
|    UsePhysicalSimulation | | |
| } | | |
| } | | |

FIG. 6B

| 3DPrintingCapabilityType { | (Number of bits) | (Mnemonic) |
|---|---|---|
| NumOfMaterialFlag | 1 | WHETHER TO USE NUMBER-OF-MATERIALS-ELEMENT |
| NumOfColorFlag | 1 | WHETHER TO USE NUMBER-OF-COLORS-ELEMENT |
| SecurityFlag | 1 | WHETHER TO USE SECURITY ELEMENT |
| NumOfSupportedFileFormatFlag | 1 | WHETHER TO USE NUMBER-OF-SUPPORTED FILE FORMATS-ELEMENT |
| maxVolumeFlag | 1 | WHETHER TO USE MAXIMUM VOLUME ELEMENT |
| SensoryDeviceCapabilityBase | | |
| If(NumOfMaterialFlag){ | | |
| NumOfMaterial | | NUMBER OF MATERIALS |
| for(k=0;k<NumOfMaterial;k++){ | | |
| Material[k] | | MATERIAL ELEMENT |
| } | | |
| } | | |
| If(NumOfColorFlag){ | | |
| NumOfColor | | NUMBER OF COLORS |
| for(k=0;k<NumOfColor;k++){ | | |
| Color[k] | | INDIVIDUAL COLOR VALUES (RGB FORMAT) |
| } | | |
| } | | |
| If(SecurityFlag){ | | |
| SecurityLevel | 4 | SECURITY LEVEL |
| } | | |
| If(NumOfSupportedFileFormatFlag){ | | |
| NumOfSupportedFileFormat | | NUMBER OF FILE FORMATS SUPPORTABLE BY PRINTER |
| for(k=0;k<NumOfSupportedFileFormat;k++){ | | |
| SupportedFileFormat[k] | 4 | FILE FORMATS SUPPORTABLE BY PRINTER, 000: Obj, 0001: STL, ETC. |
| } | | |
| } | | |
| If(maxVolumeFlag){ | | |
| maxVolume | 8 | MAXIMUM VOLUME, LENGTH IN mm |
| } | | |
| } | | |

FIG. 7

| Material{ | (Number of bits) | (Mnemonic) |
|---|---|---|
| MaterialSelect | 8 | ELEMENTS FOR MATERIAL SELECTION |
| if (MaterialSelect == 0){ // | | |
| MixedMaterialType; | | MixedMaterialType |
| }else if(MaterialSelect == 1){ // | | |
| PlasticMaterialType; | | PlasticMaterialType |
| }else if(MaterialSelect == 2){ // | | |
| RubberMaterialType; | | RubberMaterialType |
| }else if(MaterialSelect == 3){ //bio | | |
| BioMaterialType; | | BioMaterialType |
| }else if(MaterialSelect == 4){ //food | | |
| FoodMaterialType; | | FoodMaterialType |
| }else if(MaterialSelect == 5){ //Metal | | |
| MetalMaterialType; | | MetalMaterialType |
| }else if(MaterialSelect == 6){ //powder | | |
| PowderMaterialType; | | PowderMaterialType |
| }else if(MaterialSelect == 7){ //glass | | |
| GlassMaterialType; | | GlassMaterialType |
| }else if(MaterialSelect == 8){ //ceramic | | |
| CeramicMaterialType; | | CeramicMaterialType |
| } | | |
| } | | |

FIG. 8

| MaterialBaseType{ | (Number of bits) | (Mnemonic) |
|---|---|---|
| Color | | ColorType |
| heatResistingLevel | 32 | LEVEL OF RESISTANCE TO HEAT |
| colorResistingLevel | 32 | LEVEL OF RESISTANCE TO COLD |
| durabilityLevel | 32 | DURABILITY |
| transparencyLevel | 32 | TRANSPARENCY, [0: OPAQUE, 1: TRANSPARENT] |
| } | | |

| MixedMaterialType{ | (Number of bits) | (Mnemonic) |
|---|---|---|
| VERSION; | 4 | |
| MaterialBaseType; | | MaterialBaseType |
| numOfIngredient; | | NUMBER OF INGREDIENTS USED IN MIXED MATERIAL |
| for (int i=0;i<numOfIngredient;i++) | | |
| { | | |
| Percentage; | 32 | PERCENTAGE |
| Ingredient[i]; | 8 | VALUES OF INGREDIENTS USED IN MIXED MATERIAL, // 0: ABS, 1: POLYPROPYLENE 2: ACRYLIC „ |
| } | | |
| } | | |

| PlasticMaterialType{ | (Number of bits) | (Mnemonic) |
|---|---|---|
| VERSION; | 4 | |
| MaterialBaseType; | | MaterialBaseType |
| ingredient; | 8 | VALUES OF INGREDIENTS USED IN PLASTIC MATERIAL, // 0: ABS, 1: PP, 2: ACRYLIC „ |
| } | | |

FIG. 9

| RubberMaterialType{ | (Number of bits) | (Mnemonic) |
|---|---|---|
| VERSION; | 4 | |
| MaterialBaseType | | MaterialBaseType |
| ductility | 32 | //DUCTILITY |
| } | | |

| BioMaterialType{ | (Number of bits) | (Mnemonic) |
|---|---|---|
| VERSION; | 4 | |
| MaterialBaseType | | MaterialBaseType |
| Usage | 8 | DIRECTIONS,<br>00000000: DENTAL USE<br>00000001: ATTACHABLE TO BODY |
| } | | |

| FoodMaterialType{ | (Number of bits) | (Mnemonic) |
|---|---|---|
| VERSION; | 4 | |
| MaterialBaseType | | MaterialBaseType |
| flavor | 8 | FACTOR DEFINING FLAVOR,<br>00000000: CHOCOLATE<br>00000001: APPLE FLAVOR, ETC. |
| calorie | 32 | GROSS CALORIFIC VALUE |
| for (int i=0;i<5;i++){ | | |
| Ingredient[k] | 32 | RATIO OF INDIVIDUAL FIVE NUTRIENTS,<br>//ingredient[0]:<br>carbohydrate(CARBOHYDRATE),<br>//ingredient[1]:<br>proteinic(PROTEIN),<br>//ingredient[2]: fat(FAT),<br>//ingredient[3]:<br>minerals(MINERAL),<br>//ingredient[4]:<br>vitamin(VITAMIN), |
| } | | |
| } | | |

| MetalMaterialType{ | (Number of bits) | (Mnemonic) |
|---|---|---|
| VERSION; | 4 | |
| MaterialBaseType | | MaterialBaseType |
| ingredient | 8 | VALUES OF INGREDIENTS USED IN METAL MATERIAL, // 0: STEEL, 1: ALUMINUM, 2: SILVER, ETC. |
| } | | |

FIG. 10

| PowderMaterialType{ | (Number of bits) | |
|---|---|---|
| VERSION; | 4 | |
| MaterialBaseType | | MaterialBaseType |
| ingredient | 8 | VALUES OF INGREDIENTS USED IN POWDER MATERIAL, / 0: ABS POWDER, 1: ACRYLIC POWDER, ETC. |
| grainSize | 32 | SIZE OF GRAINS USED IN POWDER |
| } | | |

| GlassMaterialType{ | (Number of bits) | (Mnemonic) |
|---|---|---|
| VERSION; | 4 | |
| MaterialBaseType | | MaterialBaseType |
| } | | |

| CeramicMaterialType{ | (Number of bits) | (Mnemonic) |
|---|---|---|
| VERSION; | 4 | |
| MaterialBaseType | | MaterialBaseType |
| } | | |

FIG. 11

| Object{ | (Number of bits) | (Mnemonic) |
|---|---|---|
| PrintingFlag | 1 | |
| if (PrintingFlag ){ | | |
|    SuggestedMaterial | | MaterialType |
|    SuggestedPrintingHeight | 32 | |
|    fillInnerHole | 1 | |
|    if(! fillInnerHole){ | | |
|       thickness | 32 | |
|    } | | |
|    SecurityLevel | 4 | |
| } | 4 | |

FIG. 12

| 3DPrintingType{ | (Number of bits) | (Mnemonic) |
|---|---|---|
| UsePrintingFlagOfObject; | 1 | WHETHER TO USE METADATA INFORMATION USED IN PRINTING. IF THIS VALUE IS 1, COPY METADATA INFORMATION DEFINED IN MODEL TO CORRESPONDING FIELD |
| MaterialFlag; | 1 | |
| PrintingHeightFlag; | 1 | |
| fillInnerHoleFlag; | 1 | |
| SecurityLevelFlag; | 1 | |
| UsePrintSupporterFlag; | 1 | |
| UseLayoutOptimizerFlag; | 1 | |
| UsePhysicalSimulationFlag; | 1 | |
| UseColorMappingFlag; | 1 | |
| colorMappingTechnologyFlag; | 1 | |
| If(MaterialFlag){ | | |
|   Material | | MaterialType |
| } | | |
| If(PrintingHeightFlag){ | | |
|   PrintingHeight | 32 | |
| } | | |
| If(fillInnerHoleFlag){ | | |
|   fillInnerHole | 1 | |
|   if(!fillInnerHole) | | |
|   { | | |
|     thickness | 32 | |
|   } | | |
| } | | |

FIG. 13A

| | | |
|---|---|---|
| If(SecurityLevelFlag){ | | |
| SecurityLevel | 4 | |
| } | | |
| If(UsePrintSupporterFlag){ | | |
| UsePrintSupporter | 1 | |
| } | | |
| If(UseLayoutOptimizerFlag){ | | |
| UseLayoutOptimizer | 1 | |
| } | | |
| If(UsePhysicalSimulationFlag){ | | |
| UsePhysicalSimulation | 1 | |
| } | | |
| If(UseColorMappingFlag){ | | |
| UseColorMapping | 4 | 0000:nearest neighbor, 0001:MAPPING TABLE-BASED, ETC. |
| } | | |
| } | | |

FIG. 13B

DEVICE AND METHOD FOR SUPPORTING 3D OBJECT PRINTING AND APPARATUS FOR PROVIDING 3D OBJECT PRINTING SERVICE

CROSS REFERENCE TO RELATED APPLICATIONS

This application claims the benefit of Korean Patent Application Nos. 10-2013-0087142 filed on Jul. 24, 2013 and 10-2014-0015362 filed on Feb. 11, 2014, which are hereby incorporated by reference in their entirety into this application.

BACKGROUND OF THE INVENTION

1. Technical Field

The present invention relates generally to a device and method for supporting three-dimensional (3D) object printing, and an apparatus for providing a 3D object printing service and, more particularly, to a device and method for supporting 3D object printing and an apparatus for providing a 3D object printing service, which can print a user's desired 3D model as a real object using information such as the preference of the user, the performance of a printing device, and the information of a 3D model.

2. Description of the Related Art

As materials currently used for 3D printing, there are a wide variety of materials such as plastics (Acrylonitrile Butadiene Styrene (ABS) resin, acryl, etc.), metals (stainless steel, silver, etc.), rubber, ceramics, biological materials, and foods (chocolate, powders, etc.).

Further, even in the case of the same material, there are a wide variety of characteristics such as heat resistance (robustness to heat), durability (the level of strength), and cold resistance (the level of resistance to cold).

Upon printing a 3D model, it is difficult for a user to select which of various materials (media) is to be used. Further, there are various printable media depending on the type of a 3D printer.

Further, in accordance with the trend of current international standardization, there is a tendency to standardize metadata by which various types of devices can be controlled.

Related prior art includes technology which 3D prints only a required portion of the desired object to be printed using a multi-projection technique in conformity with specialty in the field of dentistry partially requiring high precision, and outputs the remaining portion using a normal protection technique, thus obtaining dental models optimized for the requirements of a user in the field of dentistry at minimum costs. This technology is disclosed in Korean Patent Application Publication No. 2013-0038101 ("3D printer for dental model production using multi-projection").

SUMMARY OF THE INVENTION

Accordingly, the present invention has been made keeping in mind the above problems occurring in the prior art, and an object of the present invention is to provide a device and method for supporting 3D object printing, which support 3D object printing so that 3D object printing can be performed by a 3D printer.

Another object of the present invention is to provide an apparatus for providing a 3D object printing service, which can perform a 3D object printing service in conformity with a user's desired material and the performance of the 3D printer based on the information of a 3D model, the preference information of the user, and the performance information of the printer.

In accordance with an aspect of the present invention to accomplish the above objects, there is provided a device for supporting three-dimensional (3D) object printing, including an information collection unit for collecting preference information of a user and performance information of a 3D printer; a download unit for downloading a 3D model that is an object to be printed and model information defined in the 3D model in response to a printable selection signal; a model information creation unit for creating new model information based on the 3D model and the model information defined in the 3D model, downloaded by the download unit; and a print control command generation unit for generating a print control command based on the preference information of the user and the performance information of the 3D printer, output from the information collection unit, and the new model information, output from the model information creation unit.

Preferably, the print control command generation unit transmits the print control command to the 3D printer, and thus allows 3D object printing to be performed.

Preferably, the 3D model and the model information defined in the 3D model may be packaged in a digital broadcast stream, and the download unit may download the digital broadcast stream at a corresponding time as the printable selection signal is input.

Preferably, each of the preference information of the user, the performance information of the 3D printer, the model information defined in the 3D model, and the new model information may be defined in a format of metadata.

Preferably, metadata of the preference information of the user may include information about whether to use an unfavorite material element, whether to use a maximum height element, whether to use an element for filling an inner space of a printing material, whether to use a security element, whether to use a print supporter element, whether to use a layout optimizer element, and whether to use a physical simulation element, and information about a number of unfavorite materials, a maximum height of a printed object, a thickness of a hollow printed object, and a security level.

Preferably, metadata of the performance information of the 3D printer may include information about whether to use a number-of-printing materials-element, whether to use a number-of-colors-element, whether to use a security element, whether to use a number-of-supported file formats-element, and whether to use a maximum volume element, and information about the number of printing materials, the number of colors, individual color values, a security level, a number of file formats supportable by the printer, file formats supportable by the printer, and a maximum volume.

Preferably, metadata defining the printing material may include material base elements including information about a level of resistance to heat, a level of resistance to cold, durability, and transparency; a mixed material selection element including information about the material base elements and information about percentages and values of ingredients used in a mixed material; a plastic material selection element including the information about the material base elements and information about values of ingredients used in a plastic material; a rubber material selection element including the information about the material base elements and ductility; a biometrical selection element including the information about the material base elements and information about directions for biomaterials; a food material selection element including the information about the material base elements and information about values defining flavor, a gross calorific value, and a ratio of five nutrients; a metal material selection element including the information about the material base elements and information about values of ingredients used in a metal material; a powder material selection element including the information about the material base elements and information about values of ingredients used in a powder material and a size of grains used in powder; a glass material selection element including the information about the material base elements; and a ceramic material selection element including the information about the material base elements.

Preferably, metadata of the model information defined in the 3D model may include information about whether to use a printing element and whether to fill an inner space of a printed object, and information about a proposed material, a proposed printing height, a thickness of a printed object, and a security level.

In accordance with another aspect of the present invention to accomplish the above objects, there is provided a method of supporting 3D object printing, including collecting, by an information collection unit, preference information of a user and performance information of a 3D printer; downloading, by a download unit, a 3D model that is an object to be printed and model information defined in the 3D model in response to a printable selection signal; creating, by a model information creation unit, new model information based on the 3D model and the model information defined in the 3D model, downloaded at downloading; and generating, by a print control command generation unit, a print control command based on the preference information of the user and the performance information of the 3D printer, output at collecting, and the new model information.

In accordance with a further aspect of the present invention to accomplish the above objects, there is provided an apparatus for providing a 3D object printing service, including a 3D object printing support device for generating a print control command based on preference information of a user, performance information of a 3D printer, a 3D model that is an object to be printed, and model information defined in the 3D model; and the 3D printer for performing 3D object printing based on the print control command output from the 3D object printing support device.

Preferably, the 3D object printing support device may include an information collection unit for collecting the preference information of the user and the performance information of the 3D printer; a download unit for downloading the 3D model that is the object to be printed and the model information defined in the 3D model in response to a printable selection signal; a model information creation unit for creating new model information based on the 3D model and the model information defined in the 3D model, downloaded by the download unit; and a print control command generation unit for generating the print control command based on the preference information of the user and the performance information of the 3D printer, output from the information collection unit, and the new model information, output from the model information creation unit.

BRIEF DESCRIPTION OF THE DRAWINGS

The above and other objects, features and advantages of the present invention will be more clearly understood from the following detailed description taken in conjunction with the accompanying drawings, in which:

FIGS. 6A and 6B are diagrams showing examples of metadata defining user preferences employed in the description of FIG. 5;

FIG. 7 is a diagram showing examples of metadata defining printer performance employed in the description of FIG. 5;

FIGS. 8 to 11 are diagrams showing examples of metadata defining a printing material employed in the description of FIG. 5;

FIG. 12 is a diagram showing examples of metadata defining model information 1 employed in the description of FIG. 5; and FIGS. 13A and 13B are diagrams showing examples of metadata defining model information 2 employed in the description of FIG. 5.

DESCRIPTION OF THE PREFERRED EMBODIMENTS

Figure 1:
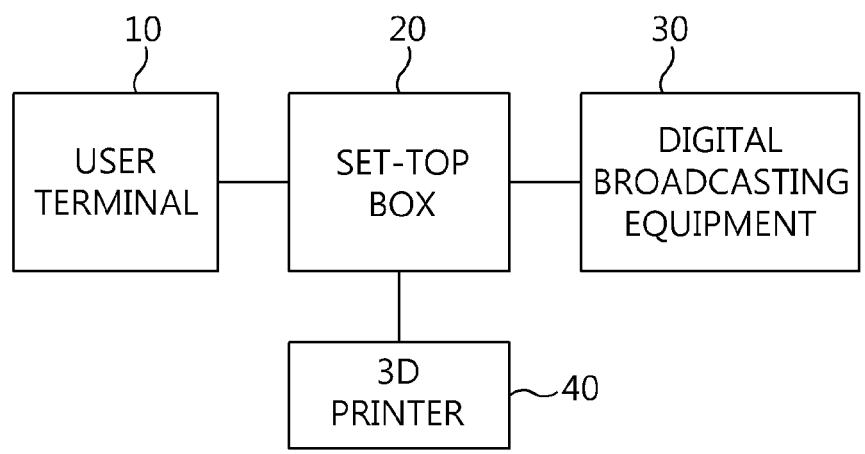
FIG. 1 is a configuration diagram showing an apparatus for providing a 3D object printing service according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 2:
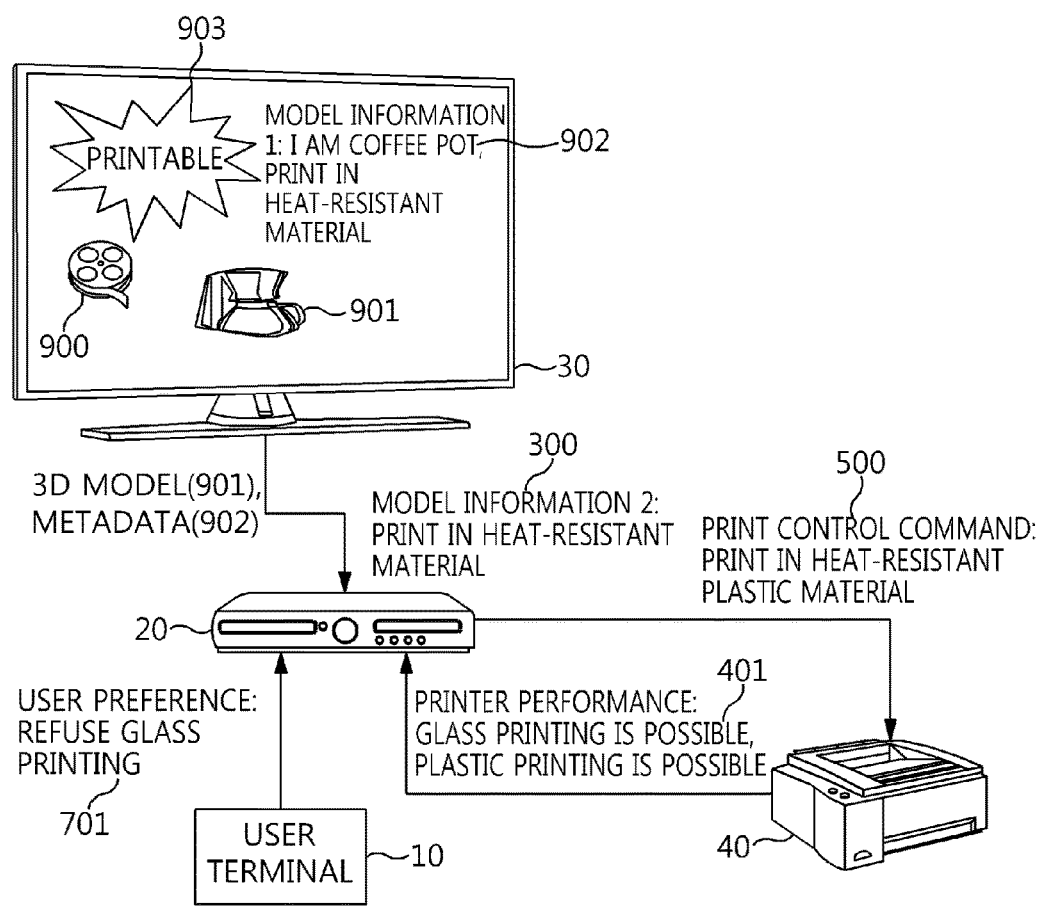
FIG. 2 is a conceptual diagram showing the apparatus for providing a 3D object printing service according to an embodiment of the present invention.
Figure 3:
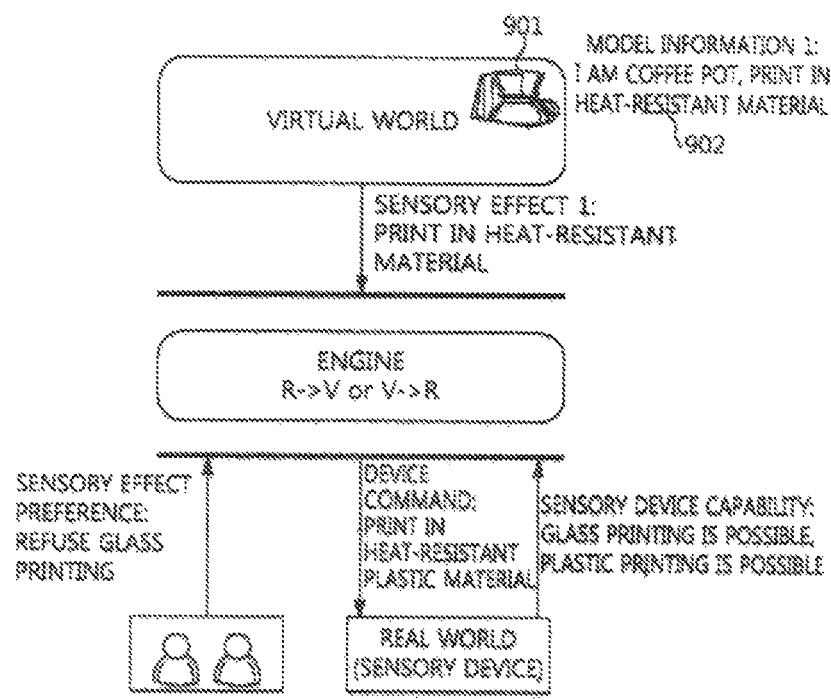
FIG. 3 is a diagram showing a case where the apparatus for providing a 3D object printing service according to the embodiment of the present invention is mapped to the structure of a MPEG-V standard (ISO/IEC 23005)

FIG. 1 is a configuration diagram showing an apparatus for providing a three-dimensional (3D) object printing service according to an embodiment of the present invention, FIG. 2 is a conceptual diagram showing the apparatus for providing a 3D object printing service according to an embodiment of the present invention, and FIG. 3 is a diagram showing a case where the apparatus for providing a 3D object printing service according to the embodiment of the present invention is mapped to the structure of a Moving Picture Experts Group Virtual Worlds standard (MPEG-V) (International Organization for Standardization (ISO)/International Electrotechnical Commission (IEC) 23005).

An apparatus for providing a 3D object printing service according to an embodiment of the present invention includes a set-top box 20 and a 3D printer 40. In the following description, since the set-top box 20 supplies various types of information to the 3D printer 40 so that the 3D printer 40 can perform 3D object printing, it may be regarded as a 3D object printing support device.

The set-top box 20 receives the preference information 701 of a user and the performance information 401 of the 3D printer 40. In this case, the preference information 701 of the user and the performance information 401 of the 3D printer 40 are set by and input from a user terminal 10. For example, the user may set the preference information 701, such as "I refuse glass printing because an object printed in glass is fragile" via his or her terminal 10, and may set the performance information 401 of the 3D printer 401, such as "My printer can print an object in glass and also print an object in a plastic material." Meanwhile, the preference information 701 of the user input by the user is converted into metadata defining the user's preference by the user terminal 10, and resulting metadata is transmitted to the set-top box 20. The performance information 401 of the 3D printer 40 input by the user is converted into metadata defining the performance of the 3D printer by the user terminal 10, and resulting metadata is transmitted to the set-top box 20. Of course, depending on the circumstances, the performance information 401 of the 3D printer 40 may be directly transmitted from the 3D printer 40 to the set-top box 20.

In this case, the user terminal 10 may be implemented as any type of wired or wireless device enabling information to be input to the set-top box 20. For example, any type of device may be used as the user terminal 10 as long as it is an information communication terminal such as a mobile phone, a smart phone, a desktop PC, a table PC, a notebook computer, a Netbook computer, or a Personal Digital Assistant (PDA).

Further, the set-top box 20 is configured to, as the user selects "printable" 903 displayed on the screen of digital broadcasting equipment 30, create new model information 2 300 based on corresponding 3D model 901 and model information 1 902 defined in the 3D model. The model information 1 902 defined in the 3D model may be, for example, information such as "I am a coffee pot. I have to be printed in a heat-resistant material." Further, the new model information 2 300 may be, for example, information such as "Print it in a heat-resistant material."

The digital broadcasting equipment 30 may provide various types of digital broadcast contents to users (viewers) while operating in conjunction with the set-top box 20. For example, the digital broadcasting equipment 30 includes a digital Television (TV). The digital broadcasting equipment 30 is capable of representing a video and a 3D model on the screen thereof. Accordingly, the 3D model 901, model information 1 902 which is information about the 3D model 901, selection area "printable" 903 (indicated by characters), etc. may be displayed on the screen of the digital broadcasting equipment 30. Meanwhile, video information 900, the 3D model 901, metadata information defined in the 3D model (that is, the model information 1 902), etc. may be packaged together in a digital broadcast stream.

Further, the set-top box 20 generates a print control command 500 by combining new model information 2 300, the preference information 701 of the user, and the performance information 401 of the 3D printer 40 in order to transmit a 3D printing command to the actual 3D printer 40.

The 3D printer 40 receives the print control command 500 and executes 3D object printing depending on metadata inserted into (defined in) the command.

Figure 4:
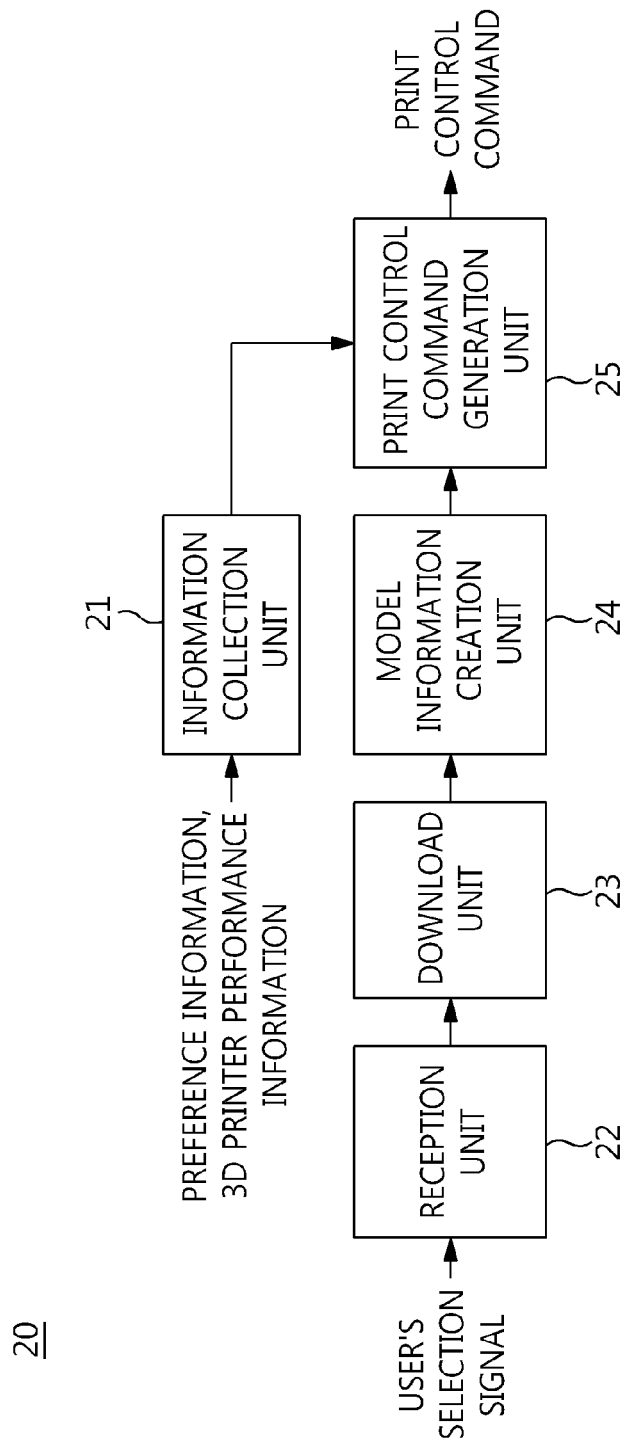
FIG. 4 is a diagram showing the internal configuration of a set-top box shown in FIG. 1.

FIG. 4 is a diagram showing the internal configuration of the set-top box shown in FIG. 1.

The set-top box 20 includes an information collection unit 21, a reception unit 22, a download unit 23, a model information creation unit 24, and a print control command generation unit 25.

The information collection unit 21 receives the preference information 701 of a user and the performance information 401 of a 3D printer 40.

The reception unit 22 receives a user's selection signal (for example, a signal indicating that "printable" 903 on the screen of the digital broadcasting equipment 30 has been selected) provided by the user terminal 10.

As the reception unit 22 receives the user's selection signal, the download unit 23 downloads 3D model 901 and model information 1 902 defined in the corresponding 3D model from the digital broadcasting equipment 30. That is, since video information 900, the 3D model 901, and metadata information (that is, the model information 1 902) defined in the 3D model may be packaged together in the digital broadcast stream, the download unit 23 may download the digital broadcast stream including the 3D model 901 and the model information 1 902, or download only the 3D model 901 and the model information 1 902 defined in the 3D model from the packaged contents.

In other words, the download unit 23 may be configured to, if a 'printable' selection signal is input by the user, download a digital broadcast stream at time at which the selection signal is input. In this case, the time at which the selection signal is input may denote only exact time at which the corresponding selection signal is input, but may have a slight time variation before and after the time at which the selection signal is input.

The model information creation unit 24 receives the 3D model 901 and the model information 1 902 defined in the model from the download unit 23, and creates new model information 2 300 based on the 3D model and the model information. Preferably, the model information creation unit 24 may extract 3D model 901 and model information 1 902 defined in the model from the digital broadcast stream downloaded by the download unit 23 and then use the 3D model and the model information. Alternatively, 3D model 901 and model information 1 902 defined in the model may be extracted from the digital broadcast stream downloaded by the download unit 23 and may be transmitted to the model information creation unit 24. Then, the model information creation unit 24 may create new model information 2 300 based on the received 3D model 901 and the model information 1 902 defined in the 3D model. Meanwhile, the new model information 2 300 includes more diverse information than the model information 1 902.

The print control command generation unit 25 generates a print control command 500 by combining the preference information 701 of the user and the performance information 401 of the 3D printer, output from the information collection unit 21, and the new model information 2 230, output from the model information creation unit 24.

The print control command generation unit 25 transmits the generated print control command 500 to the 3D printer 40, and then allows 3D object printing to be performed by the 3D printer 40.

Figure 5:
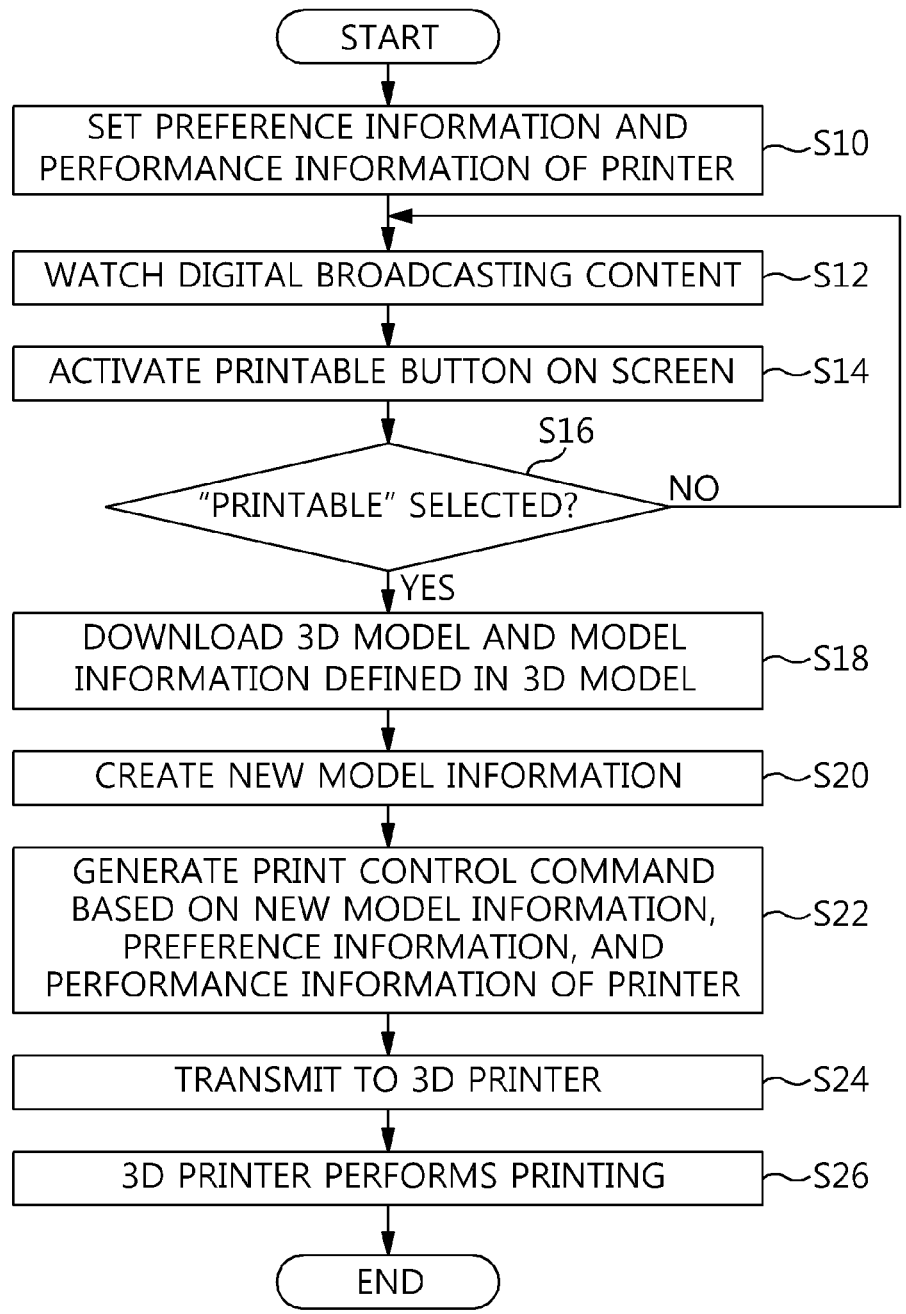
FIG. 5 is a flowchart showing a method for supporting 3D object printing and a method of providing a 3D object printing service using the method according to an embodiment of the present invention.

FIG. 5 is a flowchart showing a method for supporting 3D object printing and a method of providing a 3D object printing service using the method according to an embodiment of the present invention, FIGS. 6A and 6B are diagrams showing examples of metadata defining user preferences employed in the description of FIG. 5, FIG. 7 is a diagram showing examples of metadata defining printer performance employed in the description of FIG. 5, FIGS. 8 to 11 are diagrams showing examples of metadata defining a printing material employed in the description of FIG. 5, FIG. 12 is a diagram showing examples of metadata defining model information 1 employed in the description of FIG. 5, and FIGS. 13A and 13B are diagrams showing examples of metadata defining model information 2 employed in the description of FIG. 5.

First, the user sets his or her preference information 701 and the performance information 401 of the 3D printer via his or her terminal 10 at step S10. For example, the preference information 701 of the user may include content such as "I refuse glass printing because an object printed in glass is fragile," and the performance information 401 of the 3D printer may include content such as "My printer can print an object in glass and also print an object in a plastic material." Here, the user preference information 701 may be configured in the format of metadata such as that illustrated in FIGS. 6A and 6B by the user terminal 10. Since it is difficult to represent the entire format of the metadata of the user preference information 701 in one drawing, the drawing is merely separated into FIGS. 6A and 6B, but it should be noted that they are regarded as a continuous drawing. As shown in FIGS. 6A and 6B, the metadata defining the user preference information 701 may include information about whether to use an unfavorite material element, whether to use a maximum height element, whether to use an element for filling the inner space of a printing material, whether to use a security (stability) element, whether to use a print supporter element, whether to use a layout optimizer element, and whether to use a physical simulation element, and information about the number of unfavorite materials, the maximum height of a printed object, the thickness of a hollow printed object, and a security level. Here, the values of the information about whether to use an unfavorite material element (numOfUnfavorateMaterialFlag), whether to use a maximum height element (maxHeightFlag), whether to use an element for filling the inner space of a printing material (fillInnerHoleFlag), whether to use a security element (SecurityLevelFlag), whether to use a print supporter element (UsePrinterSupporterFlag), whether to use a layout optimizer element (UseLayoutOptimizerFlag), and whether to use a physical simulation element (UsePhysicalSimulationFlag), are set to 1-bit values. For example, if the value of the corresponding flag is "0 (zero)", it means that the associated element is not to be used, whereas if the value of the corresponding flag is "1," it means that the associated element is to be used. Meanwhile, the performance information 401 of the 3D printer may be configured in the format of metadata such as that illustrated in FIG. 7 by the user terminal 10. As shown in FIG. 7, the metadata defining the performance information 401 of the 3D printer may include information about whether to use the number-of-printing materials-element, whether to use the number-of-colors-element, whether to use a security (stability) element, whether to use the number-of-supported file formats-element, and whether to use a maximum volume element, and information about the number of printing materials, the number of colors, individual color values, a security level, the number of file formats supportable by the printer, file formats supportable by the printer, and the maximum volume. Here, the values of the information about whether to use the number-of-printing materials-element (NumOfMaterialFlag), whether to use the number-of-colors-element (NumOfColorFlag), whether to use a security element (SecurityFlag), whether to use the number-of-supported file formats-element (NumOfSupportedFileFormatFlag), and whether to use a maximum volume element (maxVolumeFlag) are set to 1-bit values. For example, if the value of the corresponding flag is "0 (zero)," it means that the associated element is not to be used, whereas if the value of the corresponding flag is "1," it means that the associated element is to be used. Further, metadata defining the printing material in FIG. 7 may have any one of the structures illustrated in FIGS. 8 to 11. The metadata defining the printing material may include information such as a mixed material selection element, a plastic material selection element, a rubber material selection element, a biomaterial selection element, a food material selection element, a metal material selection element, a powder material selection element, a glass material selection element, and a ceramic material selection element. Further, the metadata defining the printing material may include information about material base elements (that is, elements basically used in all materials). The material base elements may include information such as the level of resistance to heat, the level of resistance to cold, durability, and transparency. The mixed material selection element may include information about the percentages of materials and the values of ingredients used in mixed materials, together with the information about the material base elements. The plastic material selection element may include information about the values of ingredients used in the plastic material, together with the information about the material base elements. The rubber material selection element may include information about ductility, together with the information about the material base elements. The biomaterial selection element may include information about directions for biomaterials, together with the information about the material base elements. The food material selection element may include information about values defining flavor, a gross calorific value, and the ratio of five nutrients, together with the information about the material base elements. The metal material selection information may include information about the values of ingredients used in a metal material, together with the information about the material base elements. The powder material selection element may include information about the values of ingredients used in a powder material and the size of grains used in powder, together with the information about the material base elements. The glass material selection element and the ceramic material selection element may include the information about the material base elements, respectively.

It is assumed that the user is watching digital broadcasting content via the digital broadcasting equipment 30 at step S12.

During the watching of the digital broadcasting content, the selection area "printable" 903 may be activated at a predetermined location of the screen of the digital broadcasting equipment 30. For example, it is assumed that, as a scene in which someone has coffee in a living room is viewed on the screen, the selection area "printable" 903 is activated in the upper portion of the screen at step S14. In this case, video information 900, a 3D model 901, and metadata information (that is, model information 1 902) inserted into the corresponding 3D model are packaged together in a digital broadcast stream. Here, as the model information 1 902, information such as "I am a coffee pot. I have to be printed in a heat-resistant material" may be defined. Meanwhile, the model information 1 902 may be configured in the format of metadata such as that illustrated in FIG. 12. As shown in FIG. 12, the metadata defining the model information 1 902 may include information about whether to use a printing element (PrintingFlag) and whether to fill the inner space of a printed object, and information about a proposed material, a proposed printing height, the thickness of a printed object, and a security (stability) level.

If the user who is watching the digital broadcasting content selects the "printable" 903 on the screen of the digital broadcasting equipment 30 (Yes at step S16), a signal corresponding to the selection (selection signal) is transmitted to the set-top box 20.

Accordingly, the set-top box 20 downloads 3D model 901 and model information 1 902 defined in the 3D model from the digital broadcasting equipment 30 at step S18.

Thereafter, the set-top box 20 creates new model information 2 300 (for example, "Print an object in a heat-resistant material") based on the downloaded 3D model 901 and the model information 1 902 defined in the 3D model at step S20. In this case, the new model information 2 300 is defined by metadata, and metadata defining the new model information 2 300 may be configured in the format of metadata such as that illustrated in FIGS. 13A and 13B. Since it is difficult to represent the entire format of the metadata defining the new model information 2 300 in one drawing, the drawing is merely separated into FIGS. 13A and 13B, but it should be noted that they are regarded as a continuous drawing. As shown in FIGS. 13A and 13B, the metadata defining the new model information 2 300 includes information about whether to use metadata information used in printing, whether to use a printing material element, whether to use a printing height element, whether to use an element for filling the inner space of a printing material, whether to use a security element, whether to use a print supporter element, whether to use a layout optimizer element, whether to use a physical simulation element, whether to use a color mapping element, a printing height, whether to fill an inner space of a printed object, the thickness of a hollow printed object, and a security level.

Then, the set-top box 20 generates a print control command 500 (for example, "Print an object in a heat-resistant plastic material") optimized for the user's printer by combining the new model information 2 300, the preference information 701 of the user, and the performance information 401 of the 3D printer so as to transmit a 3D printing command to the 3D printer 40 at step S22.

Thereafter, the set-top box 20 transmits the generated print control command 500 to the 3D printer 40 at step S24.

Accordingly, the 3D printer 40 receives the print control command 500 and performs 3D object printing based on the metadata inserted into the command at step S26. Here, the 3D printer 40 may perform printing using glass, but the user does not desire glass printing, and thus printing is performed using a heat-resistant plastic material.

As described above, in the description made with reference to FIG. 5, the set-top box 20 may be the 3D object printing support device, and thus operations performed by the set-top box 20 may be regarded as 3D object printing-support operations.

In accordance with the present invention having the above configuration, a user may set the performance of his or her 3D printer and his or her preferences, and may set, for a 3D object (3D model), metadata suitable for printing, such as a printing material that can be used in the corresponding model.

Accordingly, the user may print a 3D model as a real object depending on his or her preferences using a printing material optimized for his or her 3D printer.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A device for supporting three-dimensional (3D) object printing, comprising:
   one or more processors that process computer executable program code embodied in non-transitory computer readable storage media, the computer executable program code comprising:
   information collection program code that collects preference information of a user and performance information of a 3D printer;
   download program code that downloads a 3D model that is an object to be printed and model information defined in the 3D model in response to a printable selection signal;
   model information creation program code that creates new model information based on the 3D model and the model information defined in the 3D model, downloaded by the download program code; and
   print control command generation program code that generates a print control command based on the preference information of the user and the performance information of the 3D printer, output from the information collection program code, and the new model information, output from the model information creation program code,
   wherein the device conforms to a structure of a Moving Picture Experts Group Virtual Worlds standard (MPEG-V) (International Organization for Standardization (ISO)/International Electrotechnical Commission (IEC) 23005), and
   wherein each of the preference information of the user is provided by the user in a format of metadata,
   wherein the performance information of the 3D printer, the model information defined in the 3D model, and the new model information is provided by the print control command generation program code controlled by the user and in the format of metadata, wherein metadata of the preference information of the user includes information about an unfavorite material element, a maximum height element, an element for filling an inner space of a printing material, a print supporter element, a maximum height of a printed object and a thickness of a hollow printed object, wherein metadata defining the printing material includes:
material base elements including information about a level of resistance to heat, a level of resistance to cold, durability, and transparency;
a mixed material selection element including information about the material base elements and information about percentages and values of ingredients used in a mixed material;
a plastic material selection element including the information about the material base elements and information about values of ingredients used in a plastic material; and
a metal material selection element including the information about the material base elements and information about values of ingredients used in a metal material, wherein metadata of the model information defined in the 3D model includes information about whether to use a printing element and whether to fill an inner space of a printed object, and information about a proposed material, a proposed printing height, and a thickness of a printed object, wherein the 3D model and the model information defined in the 3D model are packaged in a digital broadcast stream, and the download program code downloads the digital broadcast stream at a corresponding time as the printable selection signal is input, wherein the preference information of the user is converted into metadata defining the user's preference by the user terminal, and resulting metadata is transmitted to a set-top box, and wherein the performance information of the 3D printer is converted into metadata defining the performance of the 3D printer by the user terminal, and resulting metadata is transmitted to the set-top box.

2. The device of claim 1, wherein the print control command generation program code transmits the print control command to the 3D printer, and thus allows 3D object printing to be performed.

3. The method of claim 1, wherein metadata of the preference information of the user includes information about:
whether to use a security element,
whether to use a layout optimizer element, and
whether to use a physical simulation element, and information about a number of unfavorite materials, and a security level.

4. The device of claim 1, wherein metadata of the performance information of the 3D printer includes information about:
whether to use a number-of-printing materials-element,
whether to use a number-of-colors-element,
whether to use a security element,
whether to use a number-of-supported file formats-element, and
whether to use a maximum volume element, and information about the number of printing materials, the number of colors, individual color values, a security level, a number of file formats supportable by the printer, file formats supportable by the printer, and a maximum volume.

5. The device of claim 4, wherein metadata defining the printing material includes: a rubber material selection element including the information about the material base elements and ductility;
a biometrical selection element including the information about the material base elements and information about directions for biomaterials;
a food material selection element including the information about the material base elements and information about values defining flavor, a gross calorific value, and a ratio of five nutrients;
a powder material selection element including the information about the material base elements and information about values of ingredients used in a powder material and a size of grains used in powder;
a glass material selection element including the information about the material base elements; and
a ceramic material selection element including the information about the material base elements.

6. A method of supporting 3D object printing, comprising:
processing computer executable program code embodied in non-transitory computer readable storage media by one or more processors, the computer executable program code comprising:
program code that collects preference information of a user and performance information of a 3D printer;
program code that downloads a 3D model that is an object to be printed and model information defined in the 3D model in response to a printable selection signal;
program code that creates new model information based on the 3D model and the model information defined in the 3D model, downloaded at downloading; and
program code that generates a print control command based on the preference information of the user and the performance information of the 3D printer, output at collecting, and the new model information, wherein the method conforms to a Moving Picture Experts Group Virtual Worlds standard (MPEG-V) (International Organization for Standardization (ISO)/ International Electrotechnical Commission (IEC) 23005), wherein each of the preference information of the user is provided by the user in a format of metadata, wherein the performance information of the 3D printer, the model information defined in the 3D model, and the new model information is provided by the print control command generation program code controlled by the user and in the format of metadata, wherein metadata of the preference information of the user includes information about an unfavorite material element, a maximum height element, an element for filling an inner space of a printing material, a print supporter element, a maximum height of a printed object and a thickness of a hollow printed object, wherein metadata defining the printing material includes material base elements including information about a level of resistance to heat, a level of resistance to cold, durability, and transparency;
a mixed material selection element including information about the material base elements and information about percentages and values of ingredients used in a mixed material;

a plastic material selection element including the information about the material base elements and information about values of ingredients used in a plastic material;
a metal material selection element including the information about the material base elements and information about values of ingredients used in a metal material;
wherein the metadata of the model information defined in the 3D model includes:
  information about whether to use a printing element and whether to fill an inner space of a printed object, and
  information about a proposed material, a proposed printing height, and a thickness of a printed object,
wherein the 3D model and the model information defined in the 3D model are packaged in a digital broadcast stream, and
the program code that downloads a 3D model downloads the digital broadcast stream at a corresponding time as the printable selection signal is input,
wherein the preference information of the user is converted into metadata defining the user's preference by the user terminal, and resulting metadata is transmitted to a set-top box, and
wherein the performance information of the 3D printer is converted into metadata defining the performance of the 3D printer by the user terminal, and resulting metadata is transmitted to the set-top box.

7. The method of claim 6, wherein the program code that generates the print control command transmits the print control command to the 3D printer and allows 3D object printing to be performed.

8. The method of claim 6, wherein metadata of the preference information of the user includes information about:
  whether to use a security element,
  whether to use a layout optimizer element, and
  whether to use a physical simulation element, and information about a number of unfavorite materials, and a security level.

9. The method of claim 6, wherein metadata of the performance information of the 3D printer includes information about:
  whether to use a number-of-printing materials-element,
  whether to use a number-of-colors-element,
  whether to use a security element,
  whether to use a number-of-supported file formats-element, and
  whether to use a maximum volume element, and information about the number of printing materials, the number of colors, individual color values, a security level, a number of file formats supportable by the printer, file formats supportable by the printer, and a maximum volume.

10. The method of claim 9, wherein metadata defining the printing material includes
  a rubber material selection element including the information about the material base elements and ductility;
  a biometrical selection element including the information about the material base elements and information about directions for biomaterials;
  a food material selection element including the information about the material base elements and information about values defining flavor, a gross calorific value, and a ratio of five nutrients;
  a powder material selection element including the information about the material base elements and information about values of ingredients used in a powder material and a size of grains used in powder;
  a glass material selection element including the information about the material base elements; and
  a ceramic material selection element including the information about the material base elements.

11. An apparatus for providing a 3D object printing service, comprising:
  one or more processors that process computer executable program code embodied in non-transitory computer readable storage media, the computer executable program code comprising 3D object printing support device program code that generates a print control command based on preference information of a user, performance information of a 3D printer, a 3D model that is an object to be printed, and model information defined in the 3D model; and
  wherein the 3D printer performs 3D object printing based on the print control command output from the 3D object printing support device,
  wherein the apparatus conforms to a structure of a Moving Picture Experts Group Virtual Worlds standard (MPEG-V) (International Organization for Standardization (ISO)/International Electrotechnical Commission (IEC) 23005), and
  wherein each of the preference information of the user is provided by the user in a format of metadata,
  wherein the performance information of the 3D printer, the model information defined in the 3D model, and the new model information is provided by the print control command generation program code controlled by the user and in the format of metadata,
  wherein metadata of the preference information of the user includes information about an unfavorite material element, a maximum height element, an element for filling an inner space of a printing material, a print supporter element, a maximum height of a printed object and a thickness of a hollow printed object,
  wherein metadata defining the printing material includes:
    material base elements including information about a level of resistance to heat, a level of resistance to cold, durability, and transparency;
    a mixed material selection element including information about the material base elements and information about percentages and values of ingredients used in a mixed material;
    a plastic material selection element including the information about the material base elements and information about values of ingredients used in a plastic material;
    a metal material selection element including the information about the material base elements and information about values of ingredients used in a metal material;
  wherein metadata of the model information defined in the 3D model includes information about whether to use a printing element and whether to fill an inner space of a printed object, and information about a proposed material, a proposed printing height, and a thickness of a printed object,
  wherein the 3D model and the model information defined in the 3D model are packaged in a digital broadcast stream, and
  download program code downloads the digital broadcast stream at a corresponding time as the printable selection signal is input, wherein the preference information of the user is converted into metadata defining the user's preference by the user terminal, and resulting metadata is transmitted to a set-top box, and wherein the performance information of the 3D printer is converted into metadata defining the performance of the 3D printer by the user terminal, and resulting metadata is transmitted to the set-top box.

12. The apparatus of claim 11, wherein the 3D object printing support device comprises:

an information collection program code for collecting the preference information of the user and the performance information of the 3D printer;

a download program code for downloading the 3D model that is the object to be printed and the model information defined in the 3D model in response to a printable selection signal;

a model information creation program code for creating new model information based on the 3D model and the model information defined in the 3D model, downloaded by the download program code; and a print control command generation program code for generating the print control command based on the preference information of the user and the performance information of the 3D printer, output from the information collection program code, and the new model information, output from the model information creation program code.

* * * * *